United States Patent
Dana et al.

(10) Patent No.: US 6,382,396 B1
(45) Date of Patent: May 7, 2002

(54) ACCUMULATING CONVEYOR

(75) Inventors: Brian R. Dana, Corunna; Scott P. Bethke, Howell; Scott E. Handley, Eastpointe; Philip Rizzo, Jr., Clinton Township, all of MI (US)

(73) Assignee: Harcon Engineering Inc., Roseville, MI (US)

( * ) Notice: Subject to any disclaimer, the term of this patent is extended or adjusted under 35 U.S.C. 154(b) by 0 days.

(21) Appl. No.: 09/692,914

(22) Filed: Oct. 20, 2000

Related U.S. Application Data

(60) Provisional application No. 60/169,411, filed on Dec. 8, 1999.

(51) Int. Cl.$^7$ ............................................. B65G 47/34
(52) U.S. Cl. ............................ 198/465.4; 198/867.14; 104/172.4
(58) Field of Search ...................... 198/465.4, 687.1, 198/867.14, 867.15; 104/172.4, 172.5

(56) References Cited

U.S. PATENT DOCUMENTS

| | | | |
|---|---|---|---|
| 2,883,942 A | * 4/1959 | Johnson | 104/172.4 |
| 3,354,834 A | * 11/1967 | Orwin | 104/172.4 |
| 3,913,494 A | 10/1975 | Coleson et al. | 104/172 S |
| 4,139,091 A | * 2/1979 | Busse et al. | 104/172.4 |
| 4,287,829 A | 9/1981 | Wakabayashi | 104/172 S |
| 5,363,770 A | 11/1994 | Makimura et al. | 104/172.5 |
| 5,595,281 A | 1/1997 | Mabrey | 198/687.1 |
| 5,690,032 A | * 11/1997 | Koga et al. | 104/172.4 |
| 5,695,044 A | 12/1997 | Morikiyo et al. | 198/746 |

* cited by examiner

*Primary Examiner*—Joseph E. Valenza
(74) *Attorney, Agent, or Firm*—Young & Basile, P.C.

(57) ABSTRACT

An accumulating conveyor system has an improved carrier assembly and delatching dog therefor which allows the carrier assembly to be orientated along a carrier path in any angle relative to the ground. On a three rail conveyor system, a pallet beam is slidingly connected to the two outer rails. A beaver tail carrier is centrally located on and connected to the pallet beam. The center rail carries a moveable chain having delatching dogs attached thereon at predetermined locations. The delatching dogs are releasably connectable to the beaver tail carrier and function to maintain connection with the beaver tail carrier in any angle along the conveyor path relative to the ground by means of a spring mechanism until an encounter with another beaver tail carrier.

11 Claims, 5 Drawing Sheets

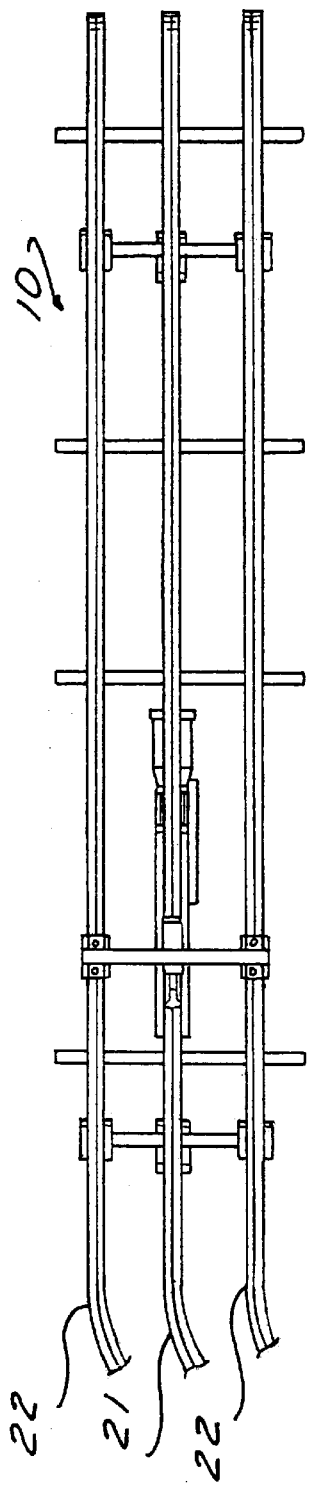
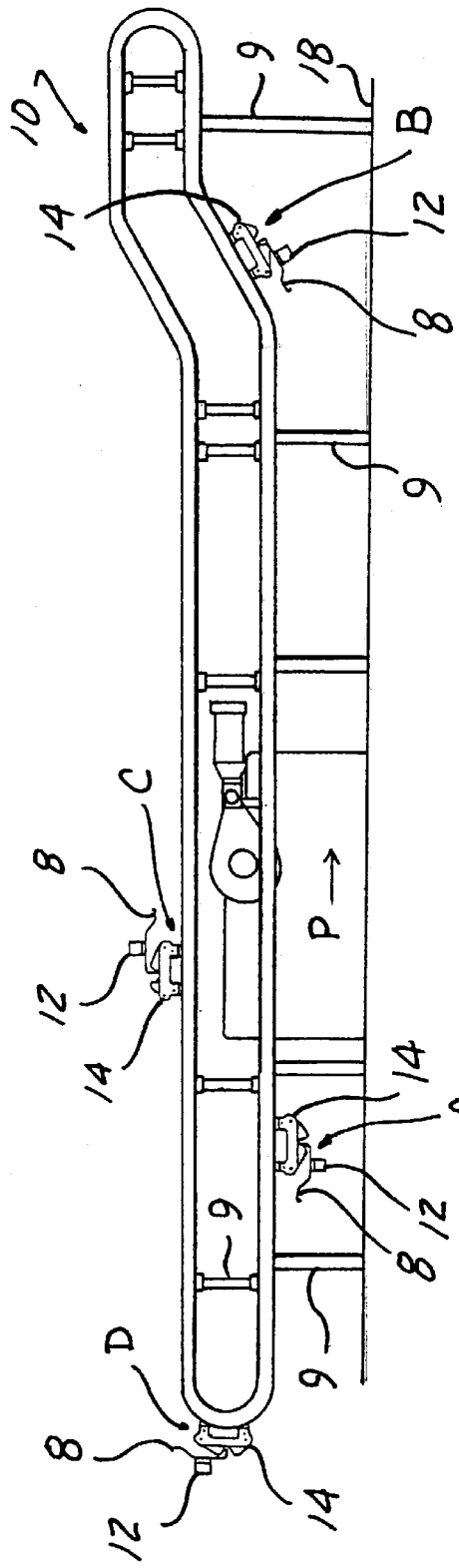
FIG. 2
FIG. 1

ACCUMULATING CONVEYOR

This application claim benefit to Provisional Application No. 60/169,411 filed Dec. 8, 1999.

FIELD OF THE INVENTION

The invention is related to an accumulating conveyor system and in particular to an improved carrier assembly and delatching dog therefor.

BACKGROUND OF THE INVENTION

In a typical conventional accumulating conveyor system, a pallet extends laterally across a rail of the conveyor by means of a carrier assembly. The conveyor system has a latching device that automatically picks up the first pallet in the series of accumulating pallets for movement along the conveyor path. A typical latching device has a delatching dog that actuates to either bypass a pallet or to latch onto the pallet for movement along the carrier path. The delatching dog is biased in a vertically down position by means of gravity. As a result of the gravitational bias of the delatching dog conventional accumulating conveyors have to maintain an essentially horizontal conveying path. This limits the potential route of the conveyor system. It is the intent of this invention to address this shortcoming of existing accumulating conveyor systems.

SUMMARY OF THE INVENTION

The invention provides for an accumulating conveyor system having a conveyor path, wherein the accumulating conveyor system includes a triple rail system suspended above the ground and having a pair of outside rails and a center rail in parallel formation. The center rail has a drive chain connected thereto. A pallet beam having a carrier assembly is slidingly connectable to the outside rails. A plurality of delatching dogs are carried by the drive chain and latch onto the carrier assembly of the pallet beam to move the pallet beam over the rail system. The configurations of the carrier assembly and the delatching dogs are particularly advantages to function although the rail system may extend in any angle relative to the ground.

The delatching dog includes a front and rear pivotal member wherein the front pivotal member pivots toward the center rail upon initial engagement with the carrier assembly. The rear pivotal member has a portion communicating with a portion of the front pivotal member so that the rear pivotal member moves with the pivotal movement of the front pivotal member. The rear pivotal member also has a spring mechanism which biases the rear pivotal member away from the center rail when the delatching dog is in its normal, biased position for engagement with the carrier assembly.

The spring mechanism and the configuration of the delatching dog as well as the configuration of the carrier assembly provides an improvement over the prior accumulating conveyor systems. The spring mechanism maintains that the pivotal members in their biased positions remain engaged with a carrier assembly regardless of the direction or orientation relative to the ground of the conveyor path. Only an encounter with another carrier assembly or a stop mechanism will disengage the delatching dog from the engaged carrier assembly.

BRIEF DESCRIPTION OF THE DRAWINGS

The description herein makes reference to the accompanying drawings wherein like reference numerals refer to like parts throughout the several views, and wherein:

FIG. 1 is a side elevational view of an accumulating conveyor system having an improved delatching dog and carrier assembly according to the present invention;

FIG. 2 is a top elevational view of the conveyor system of FIG. 1;

DESCRIPTION OF THE PREFERRED EMBODIMENT

Figure 3:
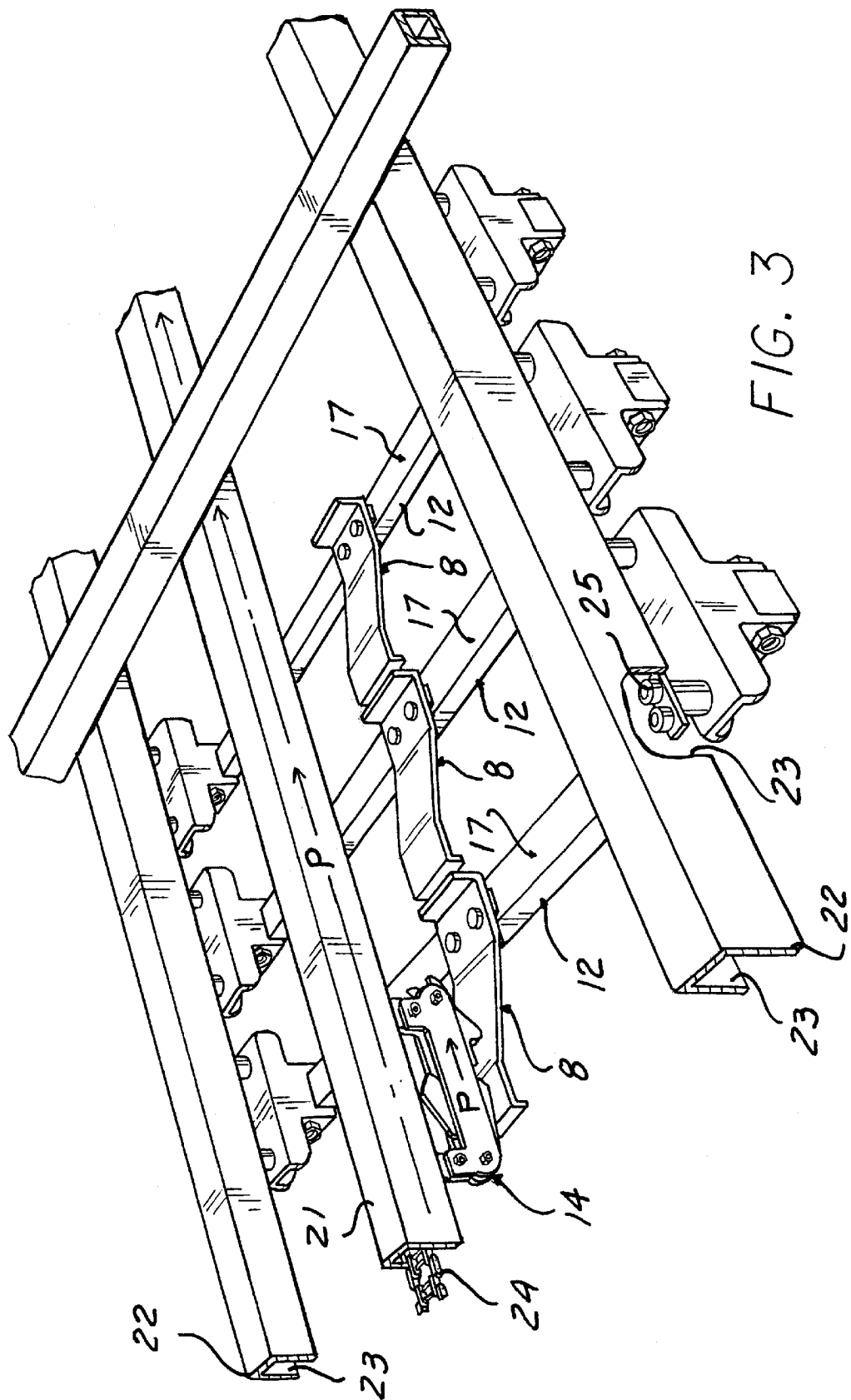
FIG. 3 is a perspective view of a portion of the conveyor system showing a delatching dog approaching a series of carrier assemblies.

An accumulating conveyor system 10 according to the present invention is shown in FIGS. 1 and 2. FIGS. 1 and 2 show only one example of a conveyor system using the improvements of the present invention. In this configuration of the conveyor system, the conveyor path takes an elongated oval route, so that a delatching dog 14 and a carrier assembly which includes a beaver tail assembly 8 and a pallet beam 12 carrying a pallet along the path can be orientated in various angular directions such as shown at locations A, B, C, or D. The delatching dog 14, beaver tail assembly 8, and pallet beam 12 can also be carried in any direction there between. Location A shows the typical orientation and arrangement of an accumulating conveyor 10 where a delatching dog 14 is biased into position to maintain the delatching dog 14 in gripping communication with a carrier assembly. In the prior art, this biased portion of the delatching dog is achieved by gravity. The improvement to the delatching dog and carrier assembly of the present invention allows the carrier assembly to be orientated along the carrier path such that the pallet beam 12 can be positioned in any angular position relative to the ground 18 as shown at location B, or in an upside down orientation as shown at location C, or in a vertical position as represented at location D.

In one embodiment of the present invention the conveyor assembly 10 includes a three rail system as shown in FIGS. 2 and 3. The three rails are positioned above the ground 18 and maintained in position by conventional support 9. The outer rails 22 may provide grooves 23 for receiving rollers 25 or bearings attached to the pallet beam 12. The surface 16 of the pallet beam 12 facing away from the conveyor rail 23 is the surface providing an area for positioning of an article to be transported. On the opposing side 17 of the pallet beam 12, i.e., the surface facing the conveyor rail 23, a carrier assembly 8 having a configuration similar to a tail of a beaver is centrally positioned and fastened onto the surface 17 by welding or bolting. The center rail 21 is configured for carrying a movable chain 24 therein. The movable chain 24 is configured for attaching a delatching dog 14 thereon at predetermined intervals. Looking at FIGS. 3 and 6a–6b, the delatching dog 14 is configured to bypass a series of beaver tail carriers 8 attached to the pallet beams 12 that are successively placed adjacent to each other until the delatching dog 14 finds the last carrier assembly encountered in the series.

Figure 4:
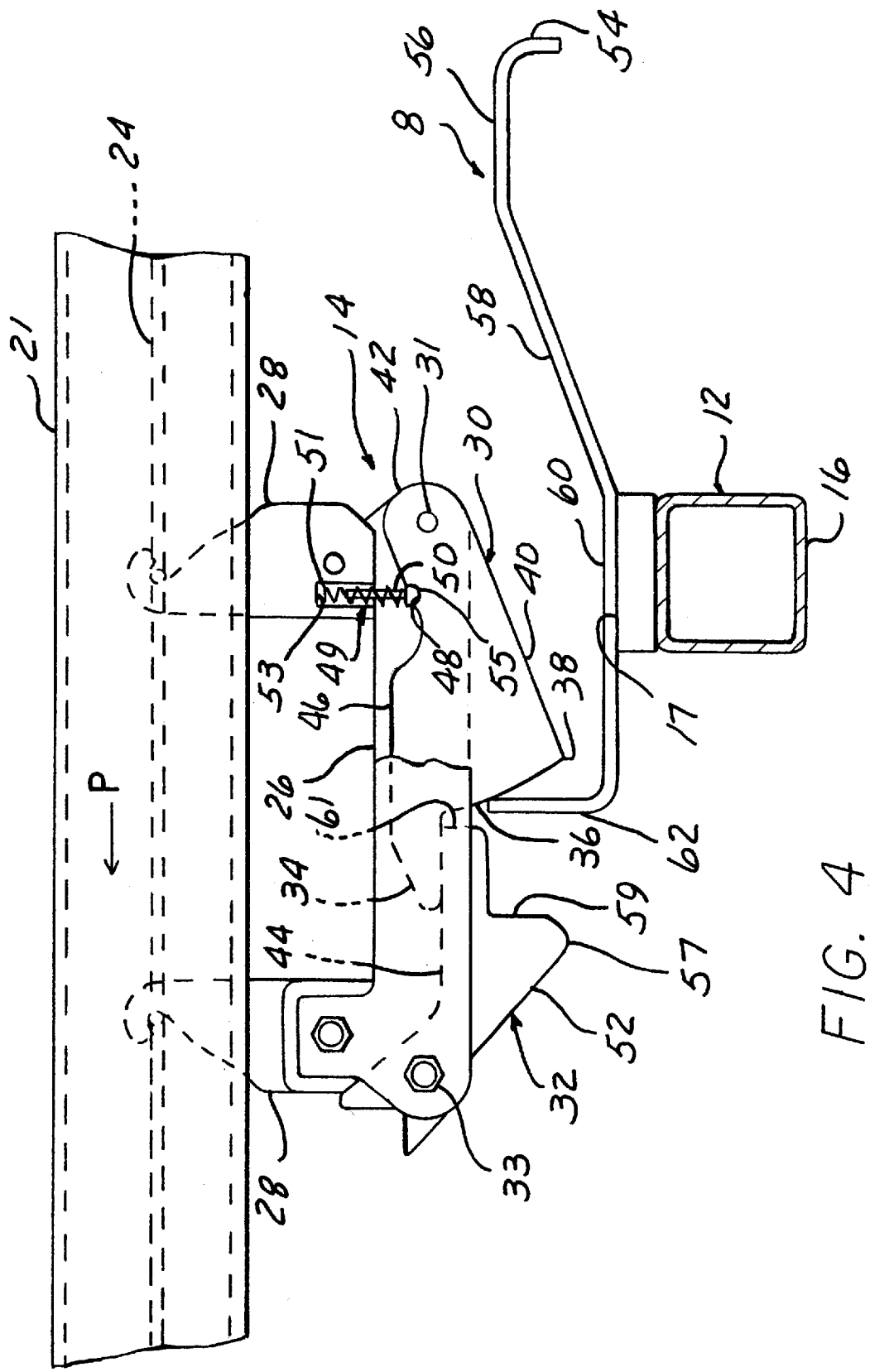
FIG. 4 is a side schematic drawing of the improved delatching dog according to the present invention.

Details of the improved delatching dog 14 and the beaver tail carrier 8 attached to the pallet beam 12 will be disclosed hereinafter. FIG. 4 shows a schematic drawing of the improved delatching dog 14 latched onto an improved beaver tail carrier 8. The delatching dog 14 includes an arm 26 having a predetermined axial length in the direction of the conveyor path as indicated by arrow P. At each end of the arm 26 are vertical extensions 28 connectable to the conveyor chain or belt 24. The vertical extensions 28 may be separate pieces connected to the arm 26 or may be integrally formed with the arm 26. The delatching dog 14 also includes a rear pivotal member 30 and a front pivotal member 32. The rear and front pivotal members are pivotally connected at the first and second ends 31, 33 respectively of the arm 26.

The rear pivotal member 30 is configured to have an extending leg portion 34 that extends past the peripheral edge of the front pivotal member 32, such that the leg 34 rests on an upper surface 44 of the front pivotal member 32. The rear pivotal member 30 includes an arcuate stop edge 36 that extends from the leg portion 34 so that when the leg portion 34 is horizontal relative to the carrier arm 26 the stop edge 36 is angularly positioned below the leg 34. The stop edge 36 comes to a point 38 and then forms a ramp 40 away from the stop edge 36 and to the rear pivotal point 42.

On the upper surface 46 of the rear pivotal member 30 and located proximate to the pivot point 42, a groove or other shallow indentation defining a spring pin seat 48 for receiving an end portion of a spring mechanism 49 is provided. The spring mechanism 49 includes a spring 51 and a pin 50 centered in the spring to provide guidance and stability to the spring 51. The spring mechanism 49 is attached in a spring retaining hole 53 inside the adjacent rear vertical extension 28 of the delatching dog and is biased to urge the rear pivotal member 30 in a direction away from the conveyor chain 24 as shown in FIG. 4. The pin 50 has a rounded end 55 to allow the spring mechanism 49 to move within the spring pin seat 48 like a joint. The rear and front pivotal members 30, 32 are configured to pivot in an upward direction (in a direction toward the conveyor chain 24) when the pivotal members 30, 32 come into contact with the beaver tail carrier 8 attached to a pallet assembly 12.

The front pivotal member 32 has a top surface 44 which provides a ledge for the leg portion 34 of the rear pivotal member 30 when the carrier assembly is in its normal biased positioned as shown in FIG. 4. The front pivotal member 32 has a lower front ramp 52 which angles away from the top surface 44 and which initially encounters the front portion 54 of the beaver tail assembly 8 as the delatching dog 14 moves along the conveyor path. The ramp 52 terminates at a bottom edge 57, which may be a rounded or angular point. The bottom edge 57 is integral with a rear linear edge 59 directed toward the top surface 44 at essentially a right angle thereto before forming a lower leg 61 upon which leg 34 of the rear pivotal member 30 rests.

The beaver tail carrier 8 is attached to a pallet beam 12 by a weld and/or bolt and screw configuration as shown in FIG. 3. Looking at the rightmost end of the beaver tail assembly 8 in FIG. 4, the beaver tail carrier 8 has a unique bar configuration which commences with a curved front portion 54 that proceeds to a horizontal flat portion 56 having a predetermined length. The curved front portion 54 raises the leg 61 of the front pivotal member 32 of the delatching dog 14 and the flat portion 56 temporarily maintains the legs 61, 34 of the front and rear pivotal members respectively in a raised position until the delatching dog 14 has passed. The beaver tail carrier 8 then proceeds to a downward ramp portion 58 terminating at a low flat portion 60 before proceeding to an upwardly vertical stop 62. The horizontal distance between the curved front portion 54 and vertical stop 62 can vary depending upon the application and pallets transported. The delatching dog 14 can move the beaver tail carrier 8 together with its attached pallet beam 12 along the path of the conveyor when the vertical stop 62 of the beaver tail carrier 8 is engaged by the arcuate stop edge 36 of the rear pivotal member 30. The vertical stop 62 remains engaged by the stop edge 36 when the delatching dog 14 is traveling along the conveying path regardless of the orientation of the path.

FIGS. 5a through 5d disclose the path of the delatching dog 14 as it encounters the beaver tail carrier 8. When the front pivotal member 32 of the delatching dog 14 engages the curved front portion 54 of the beaver tail carrier 8 by surface 52, the leg 61 of the front pivotal member 32 begins to pivot so that the leg 61 and upper surface 44 move in a direction toward the conveyor chain 24. As the front pivotal member 32 pivots, the movement of the upper surface 44 toward the conveyor chain 24, causes the rear pivotal member 30 to also pivot so that the leg portion 34 moves towards the conveyor chain 24. The stop edge 36 also moves in unison with the leg portion 34 of the rear pivotal member 30 and is raised toward the conveyor chain 24. The length of the flat portion 56 of the beaver tail carrier 8 is such that the front pivotal member 32 and rear pivotal member 30 are raised long enough so that the stop edge 36 of the rear pivotal member 30 passes the curved front portion 54 of the beaver tail carrier 8. (FIG. 5b) In addition, if a series of the beaver tail carriers 8 adjacent to each other are encountered by a delatching dog 14 on the carrier path, the flat portion 56 of a subsequent and adjacent beaver tail, carrier 8 will pivot front and rear pivotal members so that the vertical stop 62 of the prior beaver tail carrier 8 is not caught and carried by the stop edge 36.

While the leg 61 of the front pivotal member 32 is raised towards the conveyor chain 24, the rear pivotal member 30 also is raised so that the spring 51 of the spring mechanism 49 retracts in compression. As soon as the front pivotal member 32 passes the flat portion 56, the spring 51 urges leg 34 of the rear pivotal member 30 toward the direction of the beaver tail assembly 8 and away from the conveyor chain 24. As the front pivotal member 32 follows the path of the downward ramp 58 of the beaver tail carrier 8, the leg 34 of the rear pivotal member 30 temporarily maintains an upward position, because the end point 38 of the stop edge 36 is still riding on the flat portion 56 of the beaver tail carrier 8. The rear pivotal member 30 begins to pivot away from the conveyor chain 24 as the rear pivotal member 30 encounters ramp 58. This is shown in FIG. 5b.

As soon as the surface 40 of the rear pivotal member 30 moves along the downward ramp 58 of the beaver tail carrier 8, the leg 34 of the rear pivotal member 30 begins to pivot in the direction toward the beaver tail assembly 8 via the bias of the spring mechanism 49. When the front pivotal member 32 comes into contact with the vertical stop 62, the lower edge 52 of the front pivotal member 32 rides over the vertical stop 62 to momentarily raise both legs 61 and 34 of the front and rear pivotal members as shown in FIG. 5b. Once the front pivotal member 32 has passed the vertical stop 62 of the beaver tail carrier 8, the rear pivotal member 30, at the urging of the spring mechanism 49, immediately pivots away from the conveyor chain 24. The rear pivotal member 30 remains biased in the direction toward the beaver tail carrier assembly 8 by the spring mechanism 49. The leg 34 of the rear pivotal member 30 forces the front pivotal member 32 toward the beaver tail assembly 8 also. Therefore, once the vertical stop 62 has passed the front pivotal member 32 and the front pivotal member 32 has fallen to the position as shown in FIG. 5d, the rear pivotal member 30 returns back to its normal biased position. These last pivotal movements of the front pivotal member 32 and rear pivotal member 30 occur quickly so that the stop edge 36 of the rear pivotal member 30 has a portion that is in an essentially parallel orientation to the vertical stop 62 in order to engage the vertical stop 62 of the beaver tail carrier 8, as seen in FIG. 5d. If the delatching dog 14 on its continuous movement along the conveyor chain 24 meets another beaver tail carrier 8 or a carrier stop (not shown), the previous procedure will occur again. Therefore, the front pivotal member 32 and rear pivotal member 30 will again pivot up toward the conveyor chain 24 so that any beaver tail carrier 8 currently carried by the stop edge 36 of the rear pivotal member 30 will be released so that the next beaver tail carrier 8 or carriers can be accumulated behind each other.

Figure 5A:
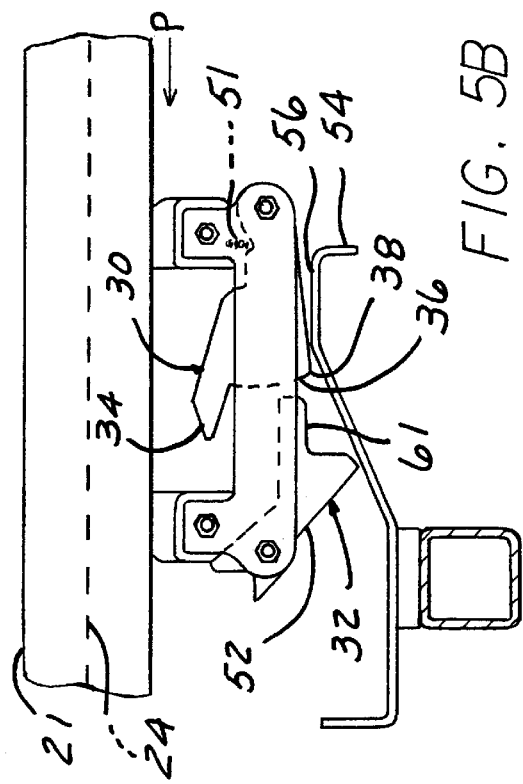
FIGS. 5a–5d are schematic drawings showing the movement of the delatching dog as it encounters a single carrier assembly attached to a pallet.
Figure 5B:
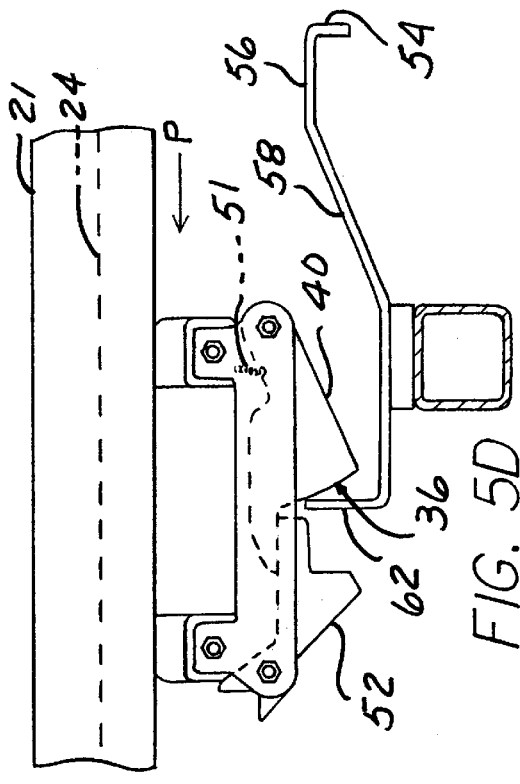
Figure 5C:
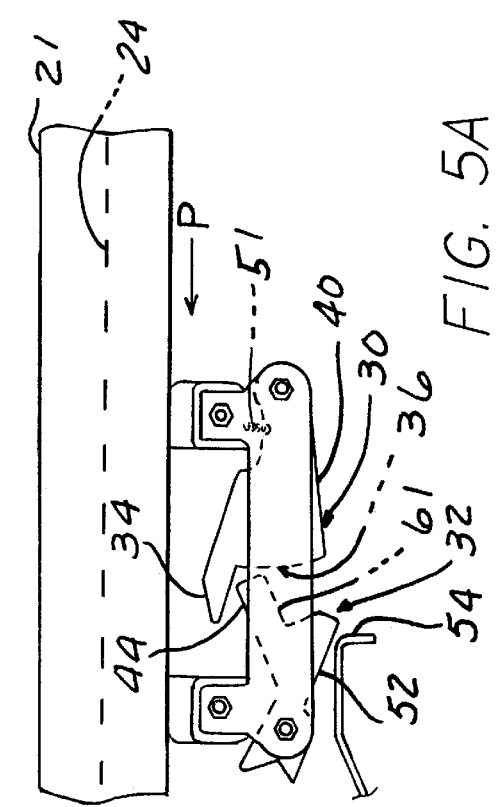
Figure 5D:
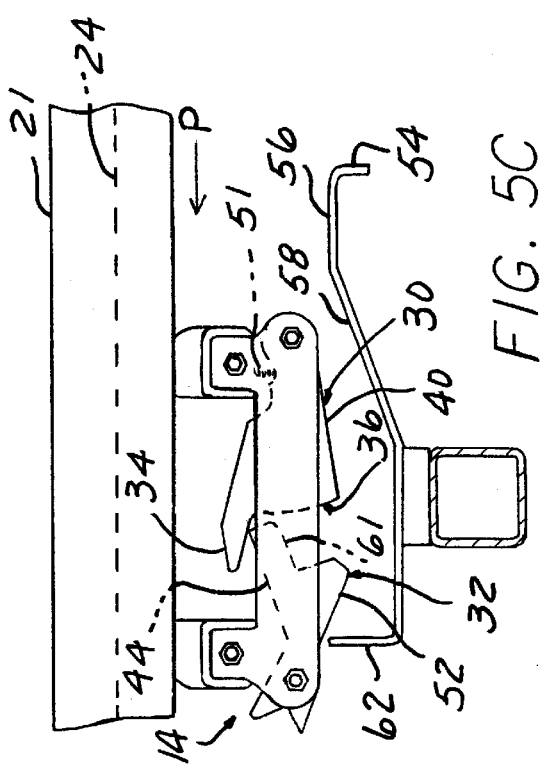
Figure 6A:
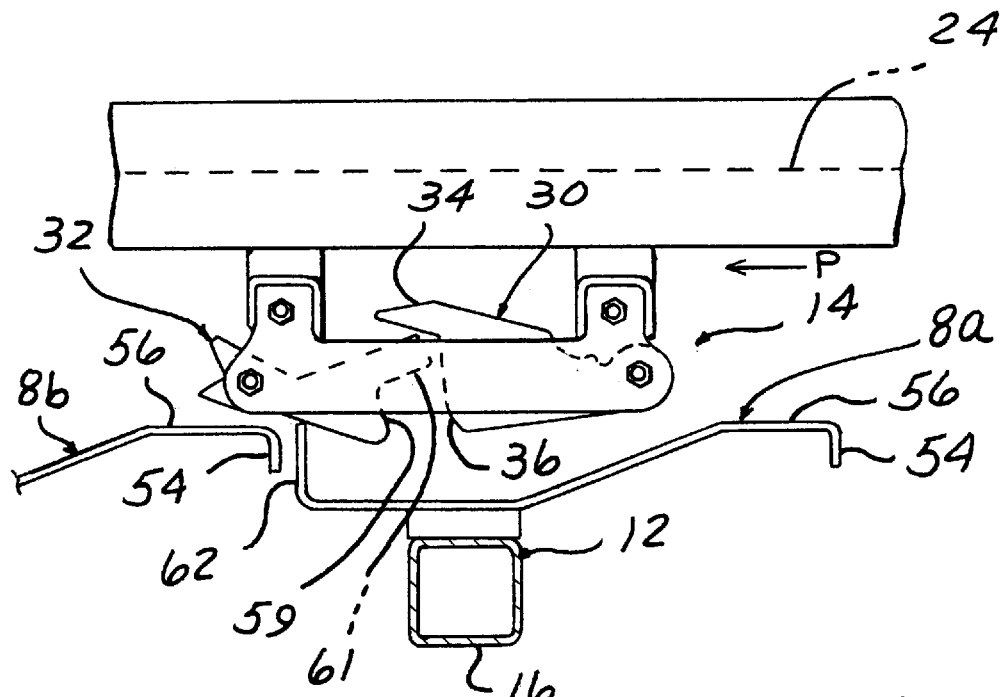
FIGS. 6a–6b are schematic drawings showing the movement of the delatching dog as it encounters a pair of adjacent carrier assemblies attached to pallets.
Figure 6B:
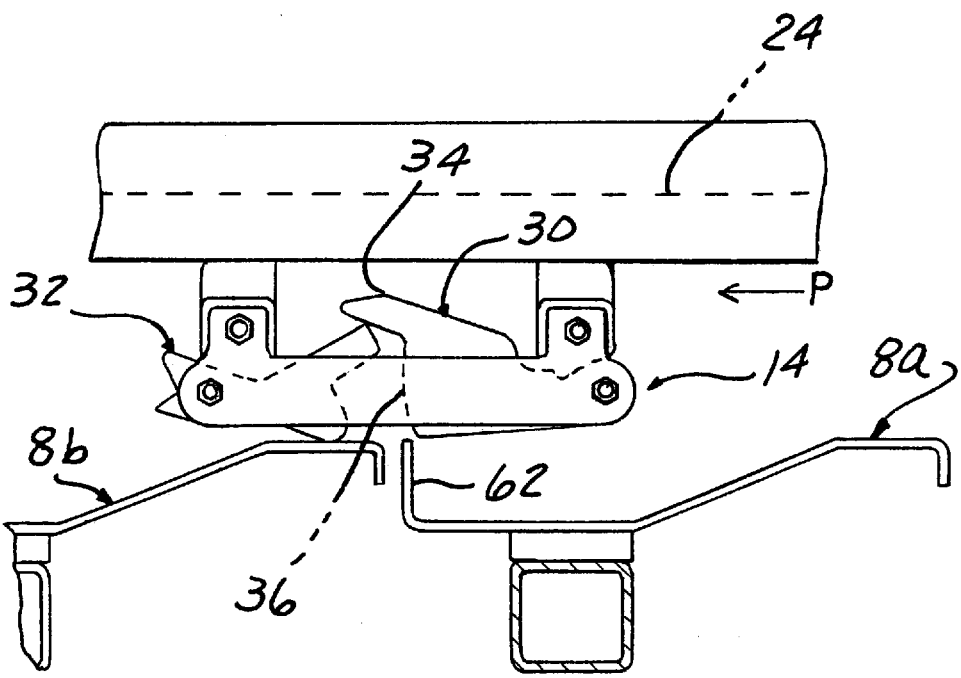

If a series of beaver tail carriers 8 are positioned adjacent to each other on the carrier path as shown in FIGS. 6a and 6b, as a delatching dog 14 encounters the series, the delatching dog 14 follows the same procedure as discussed supra, and as shown in FIGS. 5a, 5b, and 5c. As the vertical stop 62 of the prior beaver tail carrier 8a passes the front pivotal member 32, the flat portion 56 of the subsequent beaver tail carrier 8b is directly adjacent to the vertical stop 62 of the prior beaver tail carrier 8a. Therefore, the flat portion 56 of the subsequent beaver tail carrier 8b maintains the leg 61 of the front pivotal member 32 pivoted toward the conveyor chain 24, which in turn maintains the leg 34 of the rear pivotal member 30 pivoted toward the conveyor chain 24. Therefore, as can be seen in FIG. 6b, the pivotal direction of the rear pivotal member 30 prevents the stop edge 36 of the rear pivotal member 30 from engaging the vertical stop 62 of the prior beaver tail carrier 8a. In other words, the delatching dog 14 only engages the last beaver tail carrier in a continuous series.

As can be seen, the same procedure will occur no matter what orientation the delatching dog 14 or beaver tail carrier 8 is positioned. In the occurrence where the conveyor path is orientated 180° (inverted position) as shown at C in FIG. 1, the bias of the spring mechanism 49 will urge the rear pivotal member 30 toward the upper surface of the beaver tail carrier 8. The front pivotal member 32 is subject to the movement of leg 34 on the rear pivotal member 30 or by encountering a beaver tail assembly 8. The bias position of the front and rear pivotal members will maintain the vertical stop 62 of the beaver tail assembly 8 between rear linear edge 59 of the front pivotal member 32 and arcuate stop edge 36 of the rear pivotal member 30. The compression on spring mechanism 49 is less than the force applied by the beaver tail assembly 8. Therefore, the delatching dog 14 is biased in the position as shown in FIGS. 4 and 5d unless the delatching dog 14 encounters the beaver tail assembly 8 or a carrier stop.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An accumulating conveyor system having a conveyor path, said system comprising:
    a triple rail system suspended above the ground and having a pair of outside rails and a center rail in parallel formation, said center rail having a drive chain connected thereto;
    a pallet beam slidingly connectable to the outside rails, said pallet beam having a carrier assembly centrally located thereon;
    at least one delatching dog connected to the drive chain for movement therewith, said at least one delatching dog suspended from said drive chain and having means for releasable connection to a portion of said carrier assembly for slidable movement of the pallet beam along the outside rails in any angle relative to the ground.

2. The accumulating conveyor system of claim 1, wherein the carrier assembly is positioned between the triple rail system and the pallet beam.

3. The accumulating conveyor system of claim 2 wherein the delatching dog has a front and a rear pivotal member, wherein said front pivotal member pivots toward the center rail upon initial engagement with the carrier assembly, said rear pivotal member having a portion communicating with a portion of the front pivotal member.

4. The accumulating conveyor system of claim 2, where the delatching dog further includes a spring mechanism to bias the front and rear pivotal members away from the center rail when the delatching dog is in a normal position.

5. The accumulating conveyor system of claim 4, wherein the spring mechanism communicates with the rear pivotal member.

6. The accumulating conveyor system of claim 5, wherein the carrier assembly includes a bar shaped member having a first end configured to pivot the front pivotal member and an opposing second end defining a stop end.

7. The accumulating conveyor system of claim 6, wherein the rear pivotal member contacts the stop end of the carrier assembly during slidable movement of the pallet beam along the conveyor path.

8. The accumulating conveyor system of claim 6, wherein the bar shaped member is configured to allow the front and rear pivotal members to return to the normal position before the stop end contacts the rear pivotal member.

9. In an accumulator conveyor system having a conveying path extending above the ground in more than one plane and including a first rail having a drive chain and a pair of other rails parallel to the first rail, at least one carrier assembly movably connected to the other rails for transport along the conveying path, at least one delatching dog connected to the drive chain for movement along the conveying path and releasably connectable to the carrier assembly for transporting, the improvement comprising the delatching dog having a pair of pivotal members having leg extensions biased away from the drive chain when positioned in any orientation relative to the ground.

10. The conveyor system of claim 9, wherein the improvement includes a spring communicating with one of the pivotal members to bias the one of the pivotal members away from the drive chain.

11. The conveyor system of claim 10, wherein the spring has a pin therethrough having a rounded end.

\* \* \* \* \*